Aug. 22, 1967

W. R. BROWN 3,337,695

REEL FOR STARTER JUMP CABLES

Filed Sept. 10, 1964

William R. Brown
INVENTOR.

Aug. 22, 1967  W. R. BROWN  3,337,695
REEL FOR STARTER JUMP CABLES
Filed Sept. 10, 1964                                    3 Sheets-Sheet 2

William R. Brown
INVENTOR.

BY Clarence A. O'Brien
and Harvey B. Jacobson
Attorneys

Aug. 22, 1967  W. R. BROWN  3,337,695
REEL FOR STARTER JUMP CABLES
Filed Sept. 10, 1964  3 Sheets-Sheet 3

William R. Brown
INVENTOR.

United States Patent Office 3,337,695
Patented Aug. 22, 1967

3,337,695
REEL FOR STARTER JUMP CABLES
William R. Brown, 309 W. Jackson St.,
Muncie, Ind. 47305
Filed Sept. 10, 1964, Ser. No. 395,465
3 Claims. (Cl. 191—12.4)

The present invention generally relates to a reel for use in combination with jumper cables employed for interconnecting batteries of adjacent vehicles so that the storage battery of one vehicle may be electrically connected to a storage battery of another vehicle to assist in the starting of a vehicle having a run-down battery.

The use of jumper cables in starting automobiles or other vehicles with run-down batteries is a rather well known procedure. Usually, the jumper cables are stored in the trunk of a vehicle or the like and quite often become entangled with other objects in the trunk and also take up considerable space that could be used for other purposes. Jumper cables are usually provided with a manual spring loaded clamp device on each end thereof for clampingly and electrically engaging the terminals of the battery. When using the jumper cables, it is necessary usually to open the trunk and extricate the cables therefrom which sometimes requires considerable time and leads to additional frustration which already exists to a certain extent inasmuch as the storage battery will not start the automobile.

In view of the problems now existent in the storage and retention of jumper cables in an accessible position, it is the primary object of the present invention to provide a reel which may be mounted under the hood adjacent the battery on which the jumper cables are wound for storage with one end thereof being associated with an adjacent battery and extending inwardly of the reel at the center of rotation of the spool therein with the other end of the cable being free to move radially of the spool when the jumper cables are wound onto and off of the spool for engagement with the terminals of a storage battery of an adjacent vehicle.

Another object of the present invention is to provide a reel for the storage of vehicular engine starter cables that can be mounted adjacent to the battery of a vehicle such as an automobile, truck, bus, boat or the like with the reel being mounted in such a manner that it may be readily detached and conveniently carried to another location if desired.

In carrying out the objects of the present invention, the cables are constructed of insulated multiple strand wire which allows for greater flexibility necessary in coiling and the reel spindle is spring loaded so that the coil will be wound onto the reel spool so that it will be withdrawn to a retracted position.

Yet another object of the present invention is to provide a starter cable reel which is simple in construction, easy to use, effective for storing a cable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
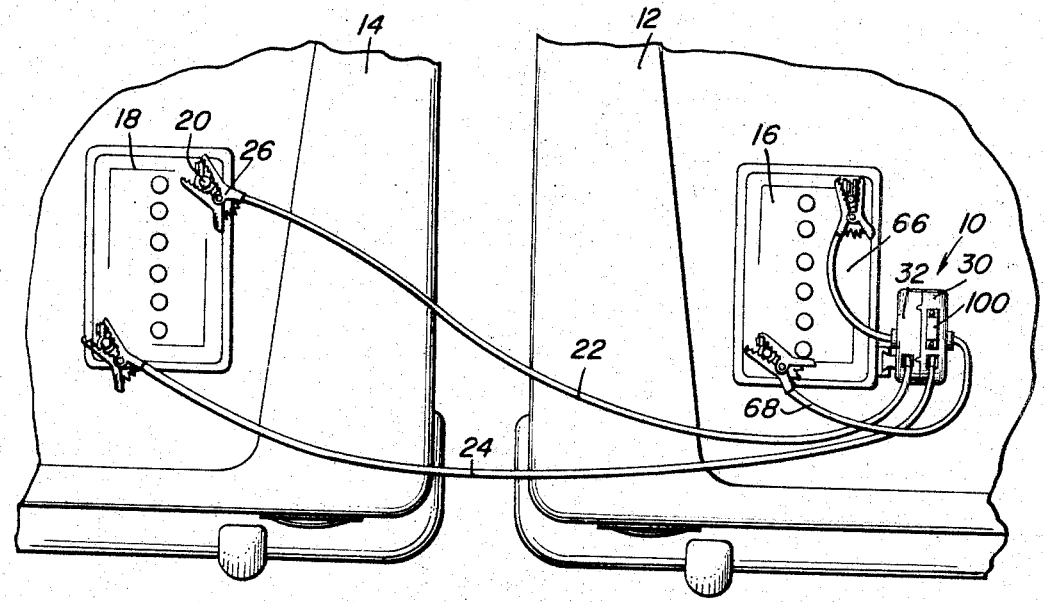
FIGURE 1 is a plan view illustrating the association of the cable reel with the battery of a vehicle illustrating the device in use.
Figure 2:
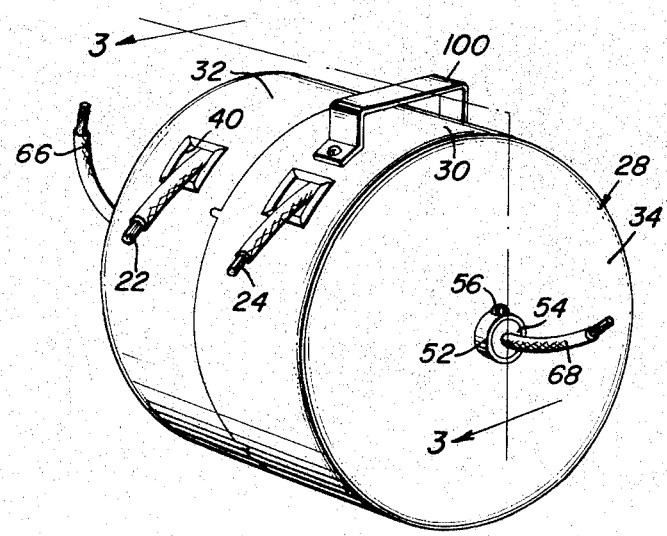
FIGURE 2 is a perspective view of the cable reel.
Figure 5:
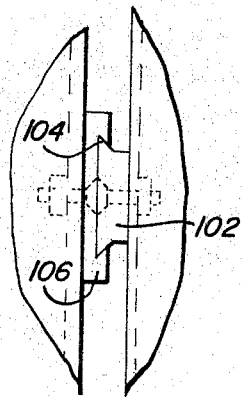
FIGURE 5 is a fragmental plan view illustrating the manner of detachably supporting the reel from a supporting bracket adjacent the battery of a vehicle.

Referring now specifically to the drawings, the numeral 10 generally designates the starter cable reel of the present invention which is illustrated in use in combination with adjacent vehicles 12 and 14 each of which has a storage battery 16 and 18 associated therewith in a conventional manner with each of the storage batteries 16 and 18 having terminals 20 which are normally connected to the electrical system of the vehicles in a conventional manner. Such details are not shown inasmuch as they form no part of this invention. The starter cables 22 and 24 have spring biased clamp devices 26 on each end thereof which may be termed alligator clamps and which are conventional for electrically connecting the cables 22 and 24 to the respective terminals of the batteries 16 and 18. The cables 22 and 24 are insulated multiple strand cables of adequate gauge to carry the necessary electrical energy to start one of the vehicles from the storage battery of the other of the vehicles. For example, if the storage battery 18 is run-down and discharged to an extent that it will not start the engine of the vehicle 14, then the battery 16 in the vehicle 12 may be electrically connected thereto by virtue of the jump cables 22 and 24 so that the operator of the vehicle 14 may crank his engine in order to start the vehicle.

Figure 3:
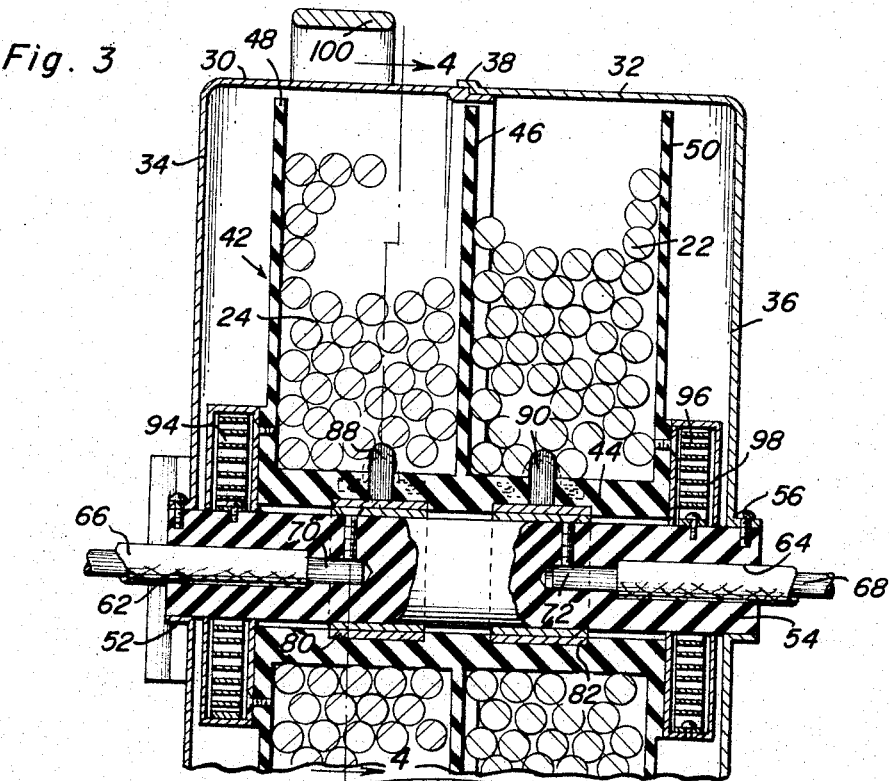
FIGURE 3 is a vertical, sectional view taken substantially upon a plane passing along section line 3—3 of FIGURE 2 illustrating further structural details of the cable reel including the manner of connecting the components of the cable to enable relative rotation therebetween while maintaining electrical contact.
Figure 4:
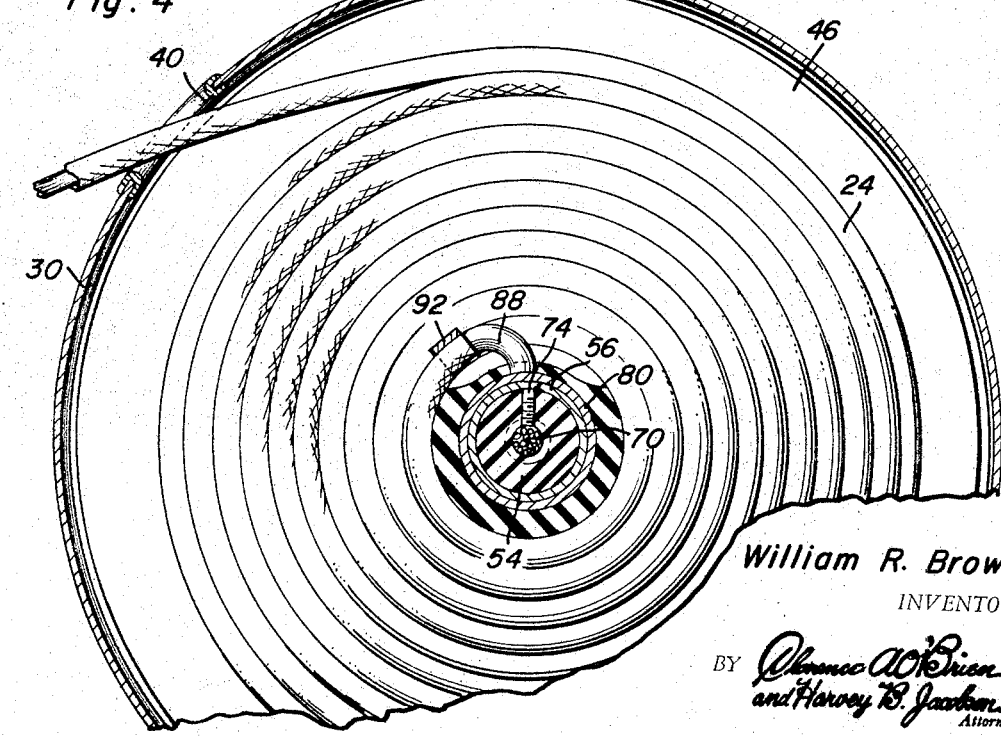
FIGURE 4 is a vertical sectional view taken substantially upon a plane passing along section line 4—4 of FIGURE 3 illustrating further structural details of the cable reel.
Figure 6:
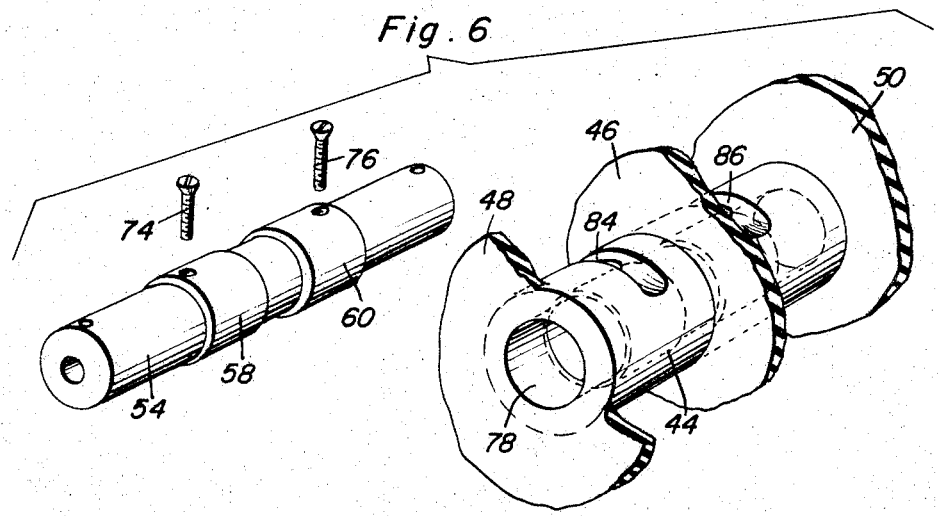
FIGURE 6 is an exploded group perspective view illustrating further details of the electrical connecting means.

The reel 10 includes a housing or caging 28 having two cup-shaped cylindrical sections 30 and 32, each having an end wall 34 and 36 respectively and an overlapping flange joint or connection 38 at the center thereof. Each cylindrical section 30 and 32 is provided with an opening 40 therein for receiving the cables 22 and 24 respectively for winding on a spool generally designated by numeral 42. The spool 42 includes a central cylindrical hub 44 having a central circular partition plate 46 and circular end plates 48 and 50 thus defining two compartments or spaces for receiving the convolutions of the cables 22 and 24. Thus, the major length of the cables 22 and 24 is normally stored on the spool 42 by virtue of the cables 22 and 24 being wound thereon between the central partition 46 and the end plates 48 and 50 respectively as illustrated in FIGURES 3 and 4.

The end walls 34 and 36 of the housing sections 30 and 32 each has central flanged openings 52 which receive and are attached to a central connector member 54 of insulated material with the end walls 34 and 36 being secured to the connector 54 by screw threaded fasteners 56 or the like. The connector 54 is provided with a pair of cylindrical contact rings 58 and 60 thereon which are in radial alignment with the inner ends of a pair of inwardly extending blind bores 62 and 64 which receive the ends of cable segments 66 and 68 respectively which are relatively short and which have the terminal ends thereof stripped of insulation as at 70 and 72 respectively so that fastening screws 74 and 76 may be inserted through the conductor rings 58 and 60 inwardly into the connector 54 and into electrical engagement with the bare ends 70 and 72 of the cable segments 66 and 68 respectively thereby electrically connecting the cable segments to the cylindrical conductor rings 58. The axial spacing of the bores 62 and 64 assures that there will be no electrical contact between the cable segments 66 and 68 and also the spacing the rings 58 and 60 assures that no electrical contact will be obtained between the cable segments 66 and 68.

The hollow cylindrical hub 44 is rotatably journaled on the cylindrical connector 54 and includes a bore 78 extending therethrough for this purpose. The inner surface of the bore 78 is provided with a pair of cylindrical contact rings 80 and 82 which are in matching electrical contact with the rings 58 and 60 on the connector 54. The hub 44 of the spindle 42 also includes a pair of circumferential grooves 84 and 86 which define passages to one portion of the contact rings 80 and 82 respectively for receiving the bare ends 88 and 90 on the cables 22 and 24 respectively. A suitable clamp mechanism 92 is provided for each cable 22 and 24 adjacent the bare ends 88 and 90 respectively which may be in the form of a U-shaped clamp having terminal ends thereof secured to the hub 44 in any suitable manner to act both as a strain relief clamp and a clamp for holding the bare end 88 or 90 in electrical contact with the rings 80 and 82 respectively. Thus, with the ends 88 and 90 held in electrical contact with the conductor rings 80 and 82 and the conductor rings 80 and 82 being in sliding electrical contact with the rings 58 and 60 which are in turn in electrical contact with the bare ends 70 and 72 of the cable segments 66 and 68, an electrical circuit will be established between the alligator clamps at the ends of the cables and between the terminals of the batteries with the reel spindle 42 being rotatable for winding and unwinding of the cable in relation to the spindle.

For spring biasing the spindle 42, each end plate 48 and 50 is provided with a spiral flat leaf spring 94 and 96 received within a housing 98 secured to the end plates 48 and 50 respectively. The inner convolution of the spring 96 is secured to the stationary connector 54 while the outer convolution of the springs 94 and 96 is secured to the housing 98 which in turn is secured to the end plates 48 and 50 thus spring biasing the reel spindle 42 in a well known manner to normally resiliently retain the cables 22 and 24 wound upon the spindle 42.

For carrying the casing or housing 28, there is provided a U-shaped handle 100 thereon attached to one section of the casing and for supporting the casing 28, a projecting bracket or lug 102 is provided on one end wall such as the end wall 34 which is tapered vertically and also provided with inwardly converging edge portions 104 for vertical sliding interlocking engagement with a bracket 106 secured to a supporting wall attached to the battery case or otherwise mounted under the hood of an automobile in convenient position for storage of the housing 28 adjacent the battery 16 with the vertical sliding interlocking connection also enabling easy removal of the casing 28 along with the cables for enabling the device to be carried to another location as desired.

Figure 7:
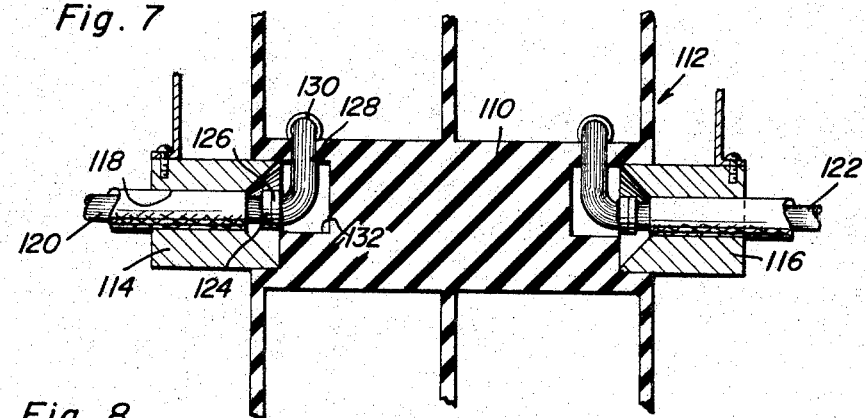
FIGURE 7 is a sectional view illustrating a modified form of the present invention.

FIGURE 7 illustrates a modified form of the invention in which the hub 110 of the reel spindle 112 is solid in the center thereof but is rotatably journaled on a pair of connectors 114 and 116 each of which has a passage 118 receiving the cable segments 120 and 122 which have the ends thereof connected with an electrical contact plate 124 respectively which plate is in rotational engagement with a contact plate 126 on the bare ends 128 of the long cable sections which are secured in place by strain relief clamps 130. The bare ends 128 extend into a passageway or recess 132 in the hub 110 and, if desired, the bare ends may be molded directly into the material which forms a hub 110 for retaining the contact plates in engagement with each other. A spring device may be provided for one of the contact plates 124, 126 to resiliently retain the contact plates in electrical contact in the event this is deemed necessary. Other than this difference in the connecting means for the cables, the spring mechanism and other structure remains the same.

Figure 8:
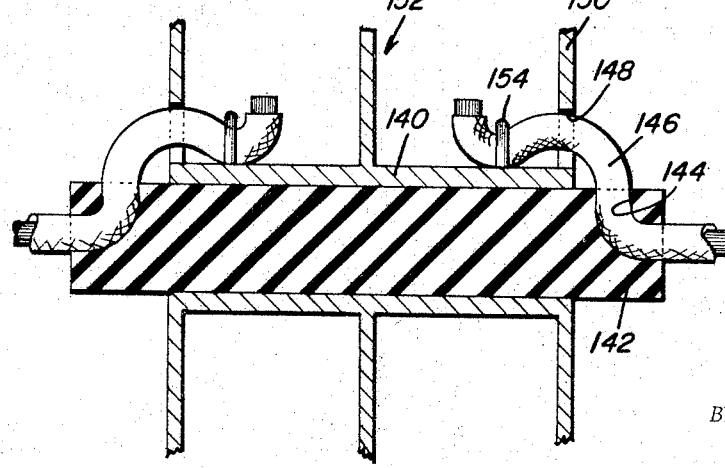
FIGURE 8 is a sectional view illustrating another modified form of the invention.

FIGURE 8 illustrates another embodiment of the invention in which the hub 140 is cylindrical and is journaled on a solid connector shaft 142 having at each end thereof a right angular passageway 144 receiving a portion of an uninterrupted cable 146 which extends in at the center of the member 142, passes radially outwardly thereof and then extends into an opening 148 on an outer end wall 150 of the reel spindle 152. The cable 146 is then attached to the hub 140 by a fastening strap or clamp 154 and is wound on the spindle 152 in the usual manner. This construction enables reeling and unreeling of the cable without providing a rotational electrical contact arrangement as an intermediate part of the cable. In this construction, the cable would normally be unwound while the alligator clamps on the short segments thereof are free of the battery terminals to enable them to rotate. After the cable has been unwound from the reel, the alligator clamps on the short segments thereof could be connected to the battery terminals. Then, when the long segments of the cable are to be wound onto the reel, the alligator clamps on the short segments would be first detached from the adjacent battery terminals to enable them to rotate about an axis generally defined by the center of rotation of the reel 152 and the solid connector 142.

In each form of the invention, the device is preferably constructed of plastic material or other insulating material capable of withstanding relatively rough usage and resistant to damage from contact with oils, greases and the like as well as heat normally found under the hood of a present day vehicle construction.

If desired, the spring structures may be provided with a windup structure to enable the springs to be initially preloaded. As a further alternative, the spring assembly could be omitted and a gear and handle drive provided for manually winding the cable onto the reel by rotating the reel spindle by using a gear drive or the like. Various types of connections may be provided for the segments of the cables including various types of electrical brush and ring combinations for effectively establishing an electrical connection.

By using the storage housing of the present invention and the reel structure incorporated therein, starter jumper cables may be conveniently stored in a compact and readily accessible manner to further enhance the benefits derived from the use of starter jumper cables.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable storage reel for starter jumper cables for connecting the storage batteries of two adjacent vehicles comprising a housing, a spindle rotatably journaled in said housing, said spindle having a pair of annular spaces defined thereon for receiving two starter jumper cables, said housing including a pair of radial openings for receiving the cables to enable the same to be wound onto and off of said spindle, means mounting said housing adjacent the storage battery of one of the vehicles, short cable segments extending inwardly of said housing at the center thereof and being electrically connected to the cables wound on the spindle for establishing electrical circuit from the ends of the short cable segments to the ends of the cables wound on the spindle thereby enabling the adjacent storage battery to be electrically connected to a remote storage battery, said housing including a handle for enabling the entire assembly to be carried to a desired location, said means for mounting said housing including a projection on said housing including wedge-shaped tapered surfaces, a bracket adapted to be mounted on one vehicle adjacent the storage battery therein for slidingly interlockingly receiving the projection on the housing for detachably supporting the housing in place, said spindle including a pair of end plates and a center partition plate, said end plates and partition plate being rigidly carried by a central hub, spring means interconnecting said hub and housing for rotating the hub and spindle in relation to the housing for spring winding of the cables on the spindle, said hub being hollow and journaled on a stationary insulated shaft, said shaft having a blind bore extending inwardly from each end thereof for receiving bare ends of the short segment of cable at each end thereof, said shaft having a pair of spaced contact rings on the outer surface thereof, clamp screws interconnecting the contact rings and the bare ends of the short cable segments, said hub including annular rings on the inner surface thereof in electrical contact with the annular rings on the shaft, and the cables wound on said spindle having bare ends extending through the peripheral wall of the hub into electrical contact with the contact rings mounted on the inner surface of the hub for electrically connecting the cables.

2. In combination with a pair of adjacent vehicles with each vehicle having a storage battery located thereon in which the storage battery of one of the vehicles is inadequately charged to start the vehicle engine, jumper cable means interconnecting the electrical terminals of the adjacent storage battery for enabling the vehicle having the inadequately charged battery to be started by employing electrical energy from the battery in the other vehicle, that improvement comprising a portable storage reel including a hollow housing, means on said housing for detachably mounting it in one of said vehicles adjacent the battery therein, a spindle means rotatably journaled in said housing, spring means interconnecting the spindle means and housing for retaining a major portion of the jumper cable means wound thereon, said housing having an opening receiving the major portion of the jumper cable means, said jumper cable means including manually operable clamp means at each end thereof for detachable clamping engagement with the battery terminals, said jumper cable means including a major portion wound onto and off of said spindle means for storage thereof when not in use, said jumper cable means also including a pair of short jumper cable means having means on the free end thereof for clamping engagement with the terminals of an adjacent battery, said spindle means including a hub, said hub including means receiving and electrically connected to the ends of the short jumper cable means and means electrically connecting the short jumper cable means to the major portion of the jumper cable means thereby electrically connecting the short jumper cable means to the major portion of the jumper cable means.

3. In combination with a vehicle having a storage battery disposed within a compartment therein, a jumper cable means for electrically connecting the terminals of the battery to the terminals of an adjacent battery in an adjacent vehicle for enabling the engine of the adjacent vehicle to be started from the electrical energy transmitted through the jumper cable means, and means storing said jumper cable means in a compact condition within the compartment of the vehicle alongside of the storage battery, said means including a housing of hollow construction, means detachably supporting said housing in the vehicle compartment alongside of the storage battery, a reel rotatably journaled in said housing, spring means interconnecting the reel and housing for spring biasing the reel in one direction, said jumper cable means including an elongated portion wound onto said reel and capable of being unwound from said reel and a relatively short portion connected to the terminals of the adjacent storage battery, said reel including a central hub having means electrically connected to the short jumper cable means and means electrically connected to the long jumper cable means for electrically connecting the jumper cable means to transmit electrical energy from the adjacent storage battery to a storage battery in an adjacent vehicle.

References Cited

UNITED STATES PATENTS

| | | | |
|---|---|---|---|
| 745,670 | 12/1903 | Riley. | |
| 752,696 | 2/1904 | Masterson | 191—12.4 |
| 793,845 | 7/1905 | Long | 191—12.2 |
| 865,377 | 9/1907 | Gordon | 191—12.2 |
| 994,292 | 6/1911 | Williamson. | |
| 2,521,226 | 9/1950 | Keller | 242—100.1 |
| 2,590,890 | 4/1952 | Redo | 191—12.4 |
| 2,654,828 | 10/1953 | Vandenberg | 191—12.4 X |
| 2,848,731 | 8/1958 | Tamarin | 191—12.4 X |
| 3,012,109 | 12/1961 | Beers | 191—12.2 |

FOREIGN PATENTS

| | | |
|---|---|---|
| 92,553 | 1/1962 | Denmark. |
| 45,819 | 9/1935 | France. |
| 691,817 | 5/1953 | Great Britain. |
| 776,738 | 6/1957 | Great Britain. |
| 52,073 | 6/1922 | Sweden. |

ARTHUR L. LA POINT, *Primary Examiner.*

STANLEY T. KRAWCZEWICZ, *Assistant Examiner.*